United States Patent
Kunzi et al.

(10) Patent No.: US 9,875,661 B2
(45) Date of Patent: Jan. 23, 2018

(54) DYNAMIC COLLISION-AVOIDANCE SYSTEM AND METHOD

(71) Applicant: AURORA FLIGHT SCIENCES CORPORATION, Manassas, VA (US)

(72) Inventors: Fabrice Kunzi, Manassas, VA (US); Donald Rogers, Manassas, VA (US); Terrence McKenna, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 32 days.

(21) Appl. No.: 14/638,255

(22) Filed: Mar. 4, 2015

(65) Prior Publication Data

US 2016/0125746 A1 May 5, 2016

Related U.S. Application Data

(60) Provisional application No. 61/991,479, filed on May 10, 2014.

(51) Int. Cl.
  *G08G 5/04* (2006.01)
  *G05D 1/00* (2006.01)
  *G05D 1/10* (2006.01)

(52) U.S. Cl.
  CPC .......... *G08G 5/045* (2013.01); *G05D 1/0088* (2013.01); *G05D 1/101* (2013.01); *G05D 1/102* (2013.01)

(58) Field of Classification Search
  CPC ...... G08G 5/045; G08G 1/0088; G08G 1/101; G08G 1/102
  See application file for complete search history.

(56) References Cited

U.S. PATENT DOCUMENTS 6,268,803 B1 7/2001 Gunderson et al.
6,670,910 B2 12/2003 Delcheccolo et al.
(Continued)

FOREIGN PATENT DOCUMENTS

EP 2 042 963 A2 4/2009
EP 2 177 966 A2 4/2010
(Continued)

OTHER PUBLICATIONS

Jong Jin Park, et al., abstract of "Giant Acoustic Concentration by Extraordinary Transmission in Zero Mass Metamaterials," Phys. Rev. Lett. 110, 244302 (published Jun. 13, 2013).
(Continued)

*Primary Examiner* — Richard Camby
(74) *Attorney, Agent, or Firm* — Michael Stanley Tomsa; McAndrews, Held & Malloy, Ltd.; Eugene H. Nahm

(57) ABSTRACT

An obstacle-avoidance system for a vehicle, the obstacle-avoidance system may comprise: a communication device; a plurality of sensors, the plurality of sensors configured to detect collision threats within a predetermined distance of the vehicle; and a processor. The processor may communicatively couple to the communication device and the plurality of sensors and configured to receive navigation commands being communicated to a control system via said communication device. The processor may also receive, from at least one of said plurality of sensors, obstruction data reflecting the position of an obstruction. Using the obstruction data, the processor identifies a direction for avoiding said obstruction. In response, the processor may output, via said communication device, a command to said control system causing the vehicle to travel in said flight direction.

31 Claims, 5 Drawing Sheets

(56) References Cited

U.S. PATENT DOCUMENTS

| | | | |
|---|---|---|---|
| 6,975,246 B1 | 12/2005 | Trudeau | |
| 7,369,460 B2 | 5/2008 | Chiappetta et al. | |
| 8,467,953 B2 * | 6/2013 | Naderhirn ............ | G05D 1/0202 |
| | | | 701/301 |
| 8,500,067 B2 | 8/2013 | Woodworth et al. | |
| 8,970,401 B2 * | 3/2015 | Molander ............... | G01S 11/12 |
| | | | 340/961 |
| 2005/0004723 A1 | 1/2005 | Duggan et al. | |
| 2005/0271221 A1 | 12/2005 | Cerwin | |
| 2007/0210953 A1 | 9/2007 | Abraham et al. | |
| 2010/0256909 A1 | 10/2010 | Duggan et al. | |
| 2010/0292871 A1 | 11/2010 | Schultz et al. | |

FOREIGN PATENT DOCUMENTS

| | | |
|---|---|---|
| EP | 2 182 419 A1 | 5/2010 |
| EP | 2287633 B1 | 2/2011 |
| EP | 2 515 147 A2 | 10/2012 |
| KR | 2010 0081759 A | 7/2010 |
| WO | 2014/064431 A2 | 5/2014 |

OTHER PUBLICATIONS

Transmittal; International Search Report; and Written Opinion f the International Searching Authority for International Application No. PCT/US2015/030099 dated Aug. 17, 2015.

* cited by examiner

DYNAMIC COLLISION-AVOIDANCE SYSTEM AND METHOD

CROSS REFERENCE TO RELATED APPLICATIONS

This application claims priority to U.S. Provisional Patent Application No. 61/991,479, filed on May 10, 2014, entitled "Autonomous Vehicle Collision-Avoidance System and Method," by Terrence McKenna et al., which is hereby incorporated by reference.

FIELD OF THE INVENTION

This present invention generally relates to autonomous vehicle navigation and, more specifically, to systems, methods, and techniques for detecting and automatically navigating around stationary and/or moving objects. This present invention also relates to sensor- and vehicle-agnostic systems, methods, and techniques for detecting and automatically navigating around objects.

BACKGROUND

Unmanned aerial vehicle ("UAV") technology has proven to be a valuable tool for mission profiles involving intelligence, surveillance, reconnaissance, and payload delivery. In contexts such as low-altitude urban reconnaissance, a UAV, such as a micro-air vehicle ("MAV"), may encounter both large and small obstacles that may be fixed or moving and whose position is not known in advance. Moreover, because UAVs and MAVs tend to fly in constrained, cluttered environments, they are prone to crashing or colliding with objects. Furthermore, UAVs and MAVs are generally less expensive than traditional aerial vehicles and, as such, are more prevalent and often utilized by less-skilled pilots who may, in turn, cause a collision. Existing technology for preventing UAVs and MAVs from running into objects and other obstacles, such as a Global Positioning System ("GPS"), is generally inadequate, as many objects cannot be recognized via a GPS device and, depending on the terrain, GPS accuracy performance varies widely across environments.

Accordingly, there remains a need for improved autonomous vehicle navigation systems and obstacle-avoidance systems that can respond to varied and unknown obstacles in cluttered navigational environments. Furthermore, there is also a need for an autonomous vehicle navigation or obstacle-avoidance system for augmenting and/or overriding navigation commands communicated to a vehicle.

SUMMARY

An autonomous vehicle may be improved with a flight-control system having a plurality of sensors (e.g., acoustic sensors, visual sensors, or the like). The plurality of sensors may be employed in connection with a collision-avoidance solution for small air vehicles, such as the Panoptes™ collision-avoidance system, more generally referred to as a dynamic obstacle-avoidance system.

According to a first aspect, an obstacle-avoidance system for a vehicle comprises: a communication device; a plurality of echolocation sensors, the plurality of echolocation sensors enabled to detect collision threats within a predetermined distance of the vehicle; and a processor, wherein the processor is communicatively coupled to the communication device and the plurality of sensors, wherein the processor receives navigation commands being communicated to a control system via said communication device, wherein the processor receives, from at least one of said plurality of sensors, obstruction data reflecting the position of an obstruction, wherein the processor identifies a direction for avoiding said obstruction, and wherein the processor outputs, via said communication device, a command to said control system causing the vehicle to travel in said flight direction. In certain aspects, the plurality of sensors may comprise at least one echolocation sensor.

In certain aspects, the command may (1) attenuate the navigation commands as a function of the distance between the vehicle and the obstruction; (2) override the navigation commands; and/or (3) instruct the vehicle to perform a responsive maneuver. In certain aspects, the command may instruct the vehicle to maintain a predetermined distance between the vehicle and the obstruction.

According to a second aspect, an obstacle-avoidance system may be enabled to provide navigation control commands without modifying the vehicle or autopilot, thereby allowing the system to be vehicle agnostic, sensor agnostic. Accordingly, the obstacle-avoidance system may, for example, (1) receive user inputs, manipulate said inputs, feed said manipulated inputs to the autopilot; and/or (2) intercept navigation controls, manipulate said navigation controls, and output said manipulated navigation controls to a control system. The obstacle-avoidance system may provide obstacle avoidance and/or holding position at a predetermined distance from an obstacle (e.g., an object). The obstacle-avoidance system may further (1) generate a global environment estimate using localized sensor measurements; and/or (2) comprise individual sensors measuring specific states for a specific field of view. Generally, the obstacle-avoidance system combines different sensors, measuring a range of states of the surrounding environment, into a single global environment estimate.

According to a third aspect, an obstacle-avoidance system for augmenting a navigation command in a vehicle, such as an autonomous aerial vehicle, may comprise: a sensor configured to detect an obstruction; and a processor, wherein the processor is communicatively coupled to the sensor and the vehicle's control system, wherein the processor receives an original navigation command from the control system, wherein the processor receives, from the sensor, obstruction data reflecting a position of an obstruction, wherein the processor modifies the original navigation command using said obstruction data to generate a modified navigation command, wherein the processor outputs the modified navigation command.

In certain aspects, the sensor may be an echolocation sensor and/or positioned to obtain a field of view in the vehicle's direction of travel. Thus, the sensor may be configured to detect an obstruction in the vehicle's direction of travel. Rather than a single sensor, a plurality of sensors, of like or different kind, may be positioned around the perimeter of the vehicle to provide a field of view that is oriented with the vehicle's line of flight.

In certain aspects, the modified navigation command may override the original navigation command. For instance, the processor may modify the original navigation command by attenuating the original navigation command to yield to the modified navigation command. The processor may then output the modified navigation command to said control system, to a steering mechanism, and/or to the steering mechanism's controller.

In certain aspects, the control system is an existing flight-control system. The obstacle-avoidance system may be operatively coupled with the vehicle without modification to the existing flight-control system. For instance, the obstacle-avoidance system may intercept an original navigation command sent from the existing flight-control system to a steering mechanism. That is, the obstacle-avoidance system may override, or replace, the original navigation command with the modified navigation command by sending the modified navigation command to the vehicle.

In certain aspects, the obstacle-avoidance system may be coupled to the exterior of the vehicle. For instance, the obstacle-avoidance system may be removably coupled with the vehicle via a modular housing. Alternatively, a portion of the obstacle-avoidance system may be integrated with the vehicle or with the control system.

According to a fourth aspect, an aerial vehicle having improved navigation, the aerial vehicle comprising a retrofit navigational module, the retrofit navigational module being configured to augment the aerial vehicle's original navigational components, wherein the retrofit navigation module is attached to the exterior of the aerial vehicle, wherein the retrofit navigational module is removable and replaceable to the aerial vehicle, wherein the retrofit navigational module's functionality is distributed in a suitable manner between the retrofit navigational module and the original navigational components permanent to the aerial vehicle, wherein the retrofit navigational module comprises at least one sensor positioned to obtain a field of view that senses obstacles within the aerial vehicle's flight path. In certain aspects, two or more retrofit navigational modules may be positioned around the perimeter of the aerial vehicle to provide a field of view that is oriented with the aerial vehicle's line of flight. The retrofit navigational module may be disposed wholly or partially within the aerial vehicle, but not permanently coupled to the aerial vehicle.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

DETAILED DESCRIPTION

Figure 1:
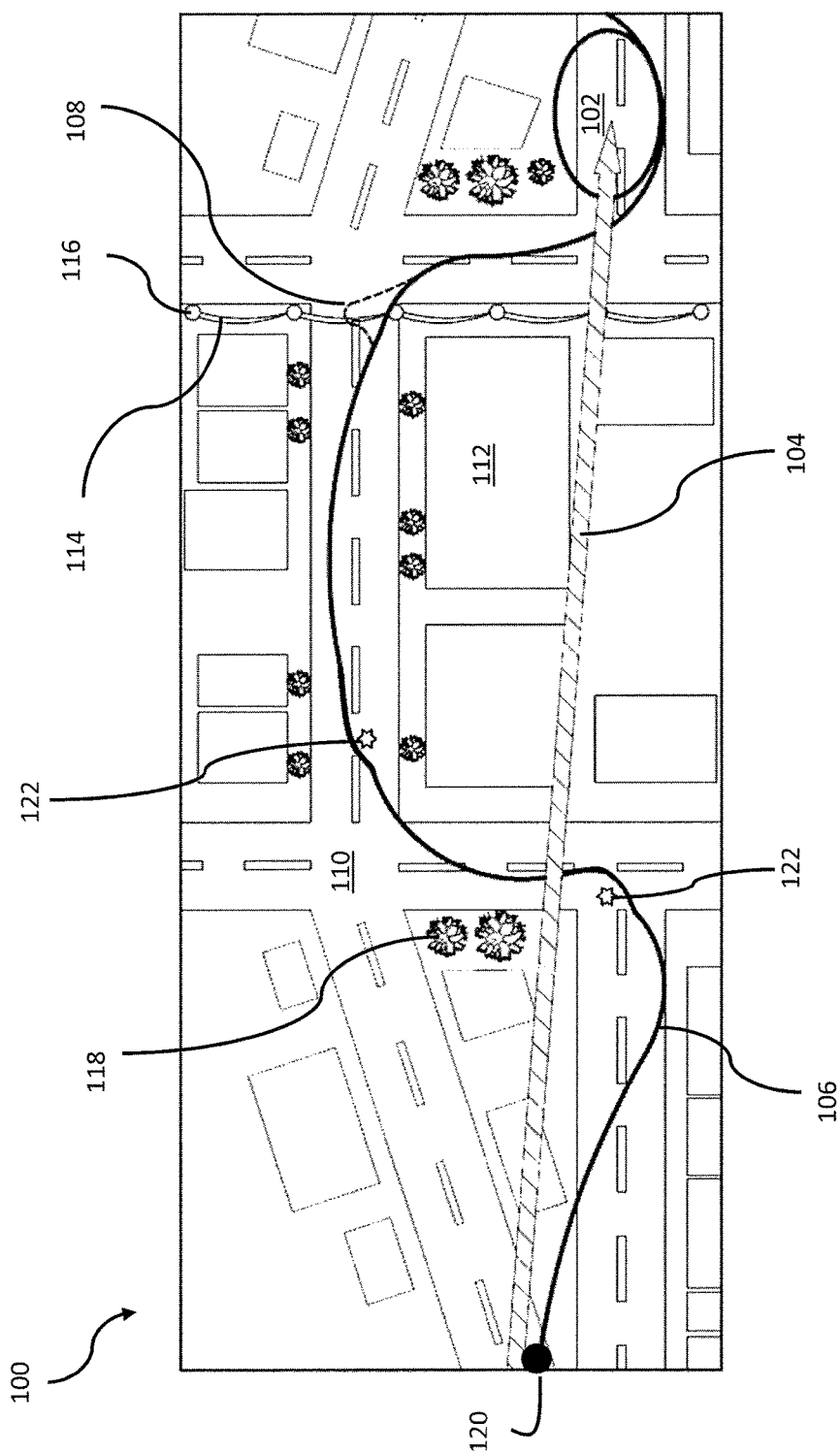
FIG. 1 shows an environment for autonomous navigation using a dynamic collision-avoidance system.

Embodiments of the present invention will be described hereinbelow with reference to the accompanying drawings. In the following description, well-known functions or constructions are not described in detail because they would obscure the invention in unnecessary detail. Described herein are devices, systems, and methods for autonomous vehicle navigation and, in particular, for navigation using multiple methods of obstacle avoidance.

All documents mentioned herein are hereby incorporated by reference in their entirety. References to items in the singular should be understood to include items in the plural and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this application, the following terms and definitions shall apply:

The terms "communicate" and "communicating," as used herein, refer to both transmitting, or otherwise conveying, data from a source to a destination and delivering data to a communications medium, system, channel, network, device, wire, cable, fiber, circuit, and/or link to be conveyed to a destination.

The term "computer," as used herein, refers to a programmable device designed to sequentially and automatically carry out a sequence of arithmetic or logical operations, including without limitation, personal computers (e.g., those available from Gateway®, Hewlett-Packard®, IBM®, Sony®, Toshiba®, Dell®, Apple®, Cisco®, Sun®, etc.), handheld, processor-based devices, and any other electronic device equipped with a processor or microprocessor.

The term "processor," as used herein, refers to processing devices, apparatus, programs, circuits, components, systems, and subsystems, whether implemented in hardware, tangibly embodied software or both, and whether or not programmable. The term "processor," as used herein includes, but is not limited to, one or more computers, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, and data processors.

The term "navigation command," as used herein, refers to instructions for guiding a vehicle. Navigation commands may be represented, or provided, by a flight-control system as digital or analog data instructions or signals. Navigation commands may be originated by, without limitation, an autopilot, a pilot (whether locally or remotely situated), and/or an obstacle-avoidance system. Navigation commands may be communicated to, for example, a controller or a steering mechanism.

The present disclosure endeavors to provide systems and methods for facilitating autonomous vehicle navigation and/or obstacle avoidance through detection of collision threats. As disclosed herein, autonomous vehicle navigation and/or obstacle avoidance may be facilitated by detecting one or more collision threats using, inter alia, auditory techniques (e.g., an echolocation sensor), visual techniques for sensing obstacles (e.g., non-cooperative targets that are stationary and/or moving), or a combination thereof. Examples of such collision threats may include obstacles such as, without limitation, birds, people, other vehicles, structures (e.g., buildings, gates, towers, etc.), foliage (e.g., trees, bushes, etc.), and the like. Autonomous vehicle navigation and/or obstacle-avoidance functionality (e.g., any hardware and/or associated methods) may be incorporated with an aerial vehicle's control system (e.g., a flight-control system, whether manned or autopilot) during its initial design and fabrication; however, such functionality may be alternatively provided through an auxiliary system (e.g., an add-on system, or "retrofit" system) configured to control, or override, an existing flight-control system. When auxiliary systems are employed, it is preferable that they do not require modifications to the existing flight-control system (e.g., original navigational components) or the aerial vehicle's structure, thereby mitigating unwanted installation time and expense, while maintaining any component warranties, certifications, etc.

In certain aspects, the autonomous vehicle navigation and/or obstacle-avoidance functionality may be vehicle- and sensor-agnostic. Indeed, for common, small UAVs, overlap exists between the maximum ranges of the echo and visual sensors and the closure rates against fixed obstacles or moving objects where those sensors are effective. Thus, the autonomous vehicle navigation, obstacle- and/or collision-avoidance functionality may employ echo sensors and/or visual sensors for distance/range measurement. For example, UAVs and MAVs may comprise sensors including those employing electroacoustic, optical, radar, and/or automatic, dependent surveillance-broadcast ("ADS-B") (e.g., an ADS-B receiver).

Autonomous vehicle navigation and/or an obstacle-avoidance system may be sensor-agnostic and process the collected data and fuse the gathered information (i.e., data) received from the various sensors to form a global environment estimate. Using the global environment estimate, features relevant to obstacle detection and navigation algorithms, or collision-avoidance algorithms, may be extracted and stored in a database. An algorithm bank may access the database in order to determine whether action must be taken to avoid a collision upon detection of a collision threat. The algorithm bank may also access the database in order to determine which action must be taken, if one is deemed necessary.

If an action is necessary, the autonomous vehicle navigation and/or obstacle-avoidance system may then interact with the preexisting vehicle infrastructure (e.g., an existing flight-control system) to prevent the collision. Indeed, the interface between the autonomous vehicle navigation and/or obstacle-avoidance system and an existing system may be vehicle-agnostic, thereby enabling it to be coupled with a variety of aerial vehicles, including preexisting aerial vehicles.

FIG. 1 shows an example environment 100 for autonomous navigation employing the presently disclosed obstacle-avoidance system, which may also be generally referred to as a dynamic collision-avoidance system, which may facilitate electronic bumper ("e-bumper") functionality. The environment 100 may include an objective 102, one or more roads 110 and any number of obstacles such as buildings 112, utility lines 114, utility poles 116, and trees 118. The environment 100 may further comprise, in addition, unanticipated obstacles 122 along the path, which may be dynamically detected using the dynamic collision-avoidance system. As illustrated, an aerial vehicle may be configured to follow one or more navigational paths (e.g., 104, 106, 108) toward the objective 102, with each path being provided or determined via, for example, auto-pilot and configured to address one or more obstacles.

In accordance with at least one aspect of the present invention, the aerial vehicle may be configured to dynamically avoid the unanticipated obstacles 122 using a dynamic collision-avoidance system, whether being guided under autopilot, or by remote control. Specifically, upon detection of collision threats (e.g., unanticipated obstacles 122), the dynamic collision-avoidance system may instruct the aerial vehicle, based on measurements received from, for example, a plurality of sensors, to override any commands from the autopilot or pilot (e.g., via the flight-control system) to avoid the unanticipated obstacles 122 and ultimately return to a navigational path.

Figure 2A:
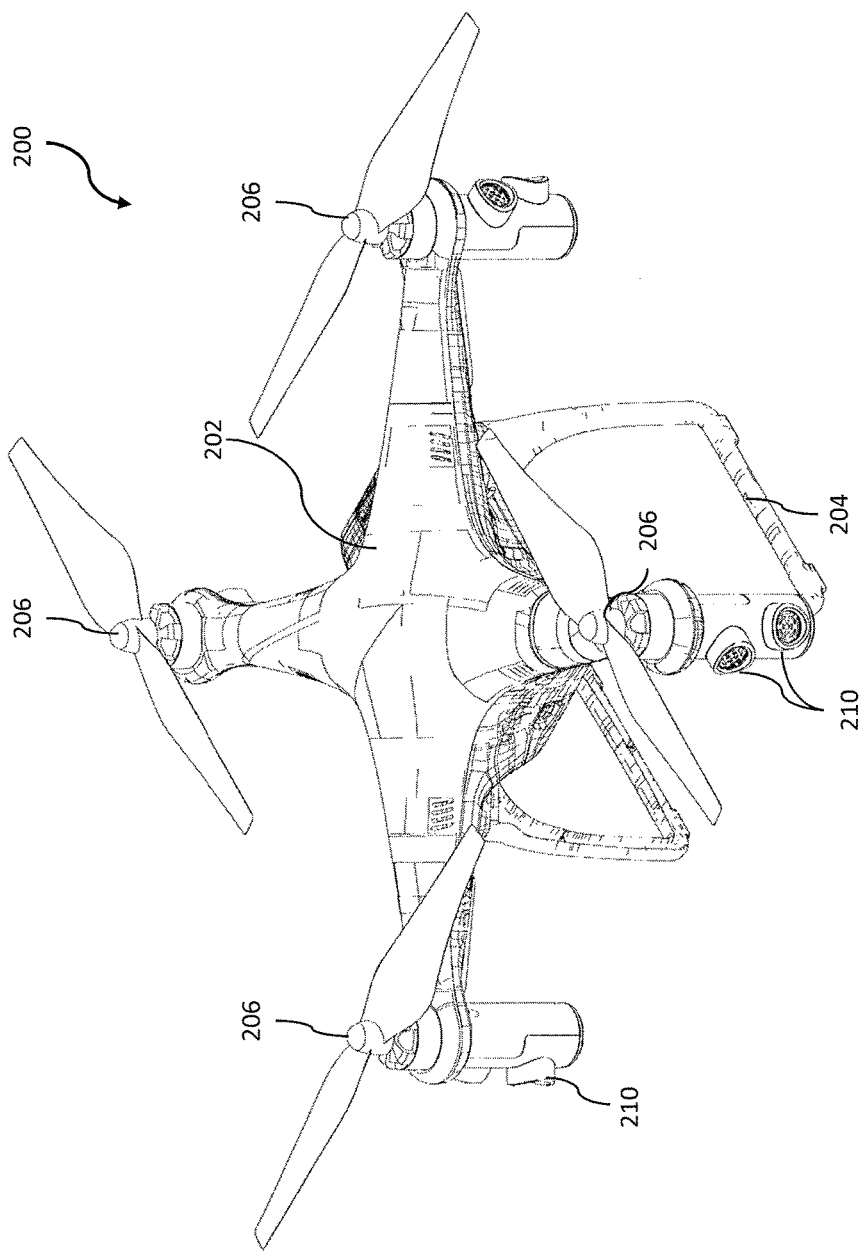
FIG. 2a illustrates a first example autonomous vehicle having a dynamic collision-avoidance system.
Figure 2B:
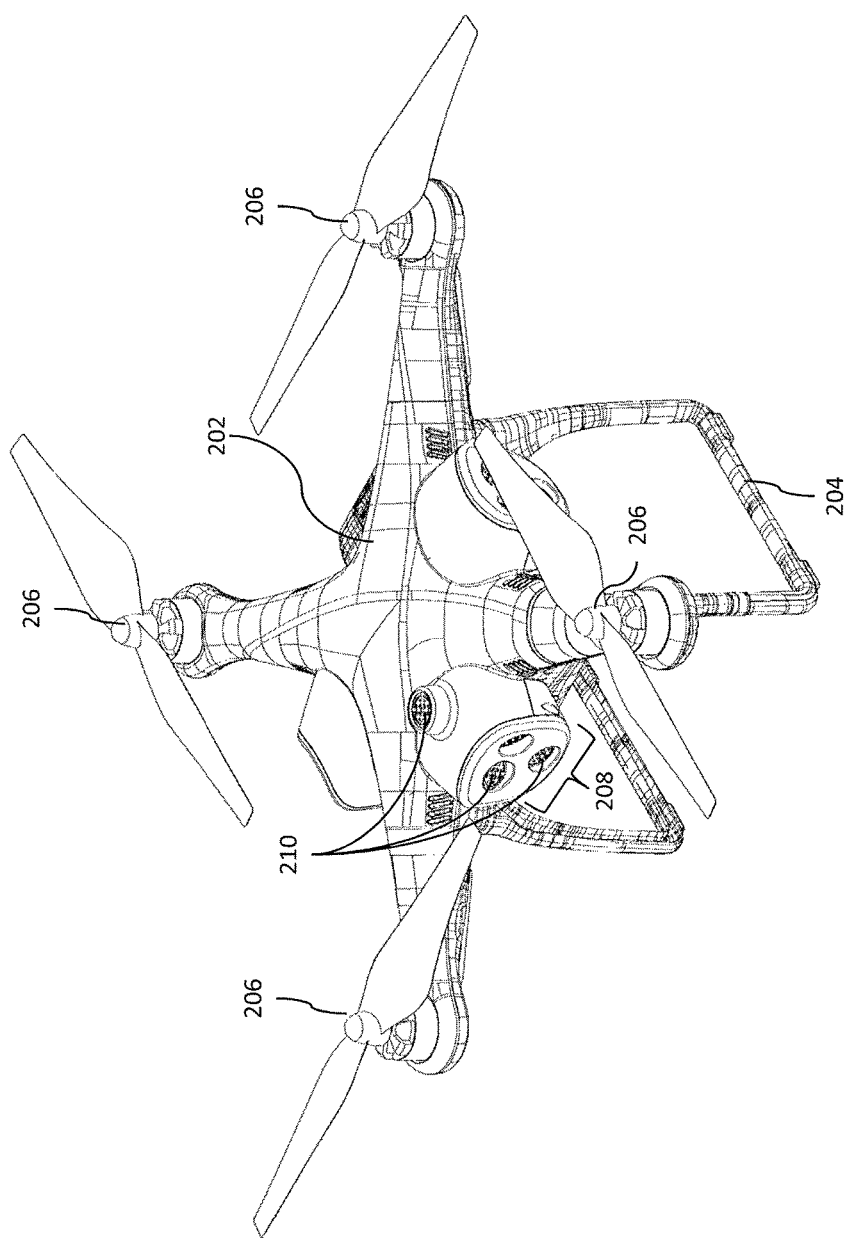
FIG. 2b illustrates a second example autonomous vehicle having a dynamic collision-avoidance system.

FIGS. 2a and 2b illustrate perspective views of a vehicle (e.g., an autonomous vehicle) suitable for use with a dynamic collision-avoidance system. The vehicle 200 illustrated in FIG. 2a may comprise an airframe 202, landing gear 204, an electronics module 300 (illustrated in FIG. 3), and one or more thrust generators 206 (e.g., a turbine, a motor or engine operatively coupled with a propeller, etc.). The electronics module 300 may be integrated with the airframe 202, or provided via a separate housing or pod. FIG. 2b illustrates a second vehicle that is substantially the same as the vehicle 200 of FIG. 2a; however, the sensors 210 of the second vehicle are positioned closer to the center of the vehicle and arranged in a separate housing 208. Specifically, while one may be suitable for certain uses, two or more separate housings 208 (e.g., retrofit navigation modules) may be positioned around the perimeter of the vehicle 200 to provide a field of view that is oriented with the aerial vehicle's line of flight. The separate housing 208 may be detachable from the airframe 202 and may be further configured to house the electronics module 300, or portion thereof (e.g., functioning as an electronics module 300 housing). Further, separate housing 208's functionality may be distributed in a suitable manner so as to not require modification to the original navigational components or structures permanent to the aerial vehicle.

Thus, it should be appreciated that the sensor 210 location may be determined by the designer as needed for a particular purpose, sensor type, and/or operation; and therefore should not be limited to the layouts depicted in this disclosure. The landing gear 204 may be simple skids, as illustrated, or any other device capable of supporting the vehicle 200 when it is not flying, while allowing it to take off, land, and/or taxi without damage, such as wheels, skids, skis, floats, or a combination thereof. The landing gear 204 may also be retractable so as to reduce drag when in flight.

To facilitate controlled flight by adjusting roll, pitch, and yaw of the vehicle 200, the vehicle 200 may further comprise one or more steering mechanisms or equivalent steering systems configured to receive a navigation command and to respond accordingly. To that end, a steering mechanism may be operatively coupled with a controller or include one or more processors, actuators, motors, and/or other devices (e.g., electrical or electromechanical devices) capable of receiving and responding to a navigation command. Suitable steering mechanisms include, without limitation, traditional flight-control surfaces (e.g., flaps, ailerons, elevators, rudders, spoilers, air brakes, and/or other flight-control surfaces), as well as other flight-control mechanisms, such as vectored-thrust control systems. Vectored-thrust control functionality may be facilitated by moving the thrust generators 206 to direct the thrust in a desired direction, thus controlling flight. For instance, an articulated, electric motor arrangement may employ vectored-thrust control to directly change the thrust vector. Indeed, independently articulating thrust-vectoring motor pods allow rapid transition between vertical and horizontal flight. In certain aspects, the vehicle 200 may further comprise two or more fins (e.g., vertical stabilizers, and/or horizontal stabilizers), particularly with regard to fixed-wing aerial vehicles.

The vehicle 200 may further comprise an intelligence, surveillance, reconnaissance ("ISR") payload for gathering data. For example, the vehicle 200 may be equipped with a payload pod comprising one or more cameras, audio devices, and other sensors. Any video, image, audio, telemetry, and/or other sensor data ("Surveillance Data"), collected by the UAV 106 may be locally stored or wirelessly communicated from the vehicle 200 to a remote location in real time using an antenna coupled with an onboard wireless communication device, such as a transmitter/receiver. Alternatively, Surveillance Data may be communicated, or otherwise transferred, to the remote location or another party via a wired connection (e.g., when tethered, or on the ground, post operation).

While the vehicles 200 depicted in FIGS. 2a and 2b are vertical-takeoff-and-landing ("VTOL") aerial vehicles, it will be understood that the autonomous vehicles described herein may include any vehicle, device, component, element, etc., that may be usefully navigated using the principles of the dynamic collision-avoidance system disclosed herein, including, without limitation, any unmanned vehicle, manned vehicle, aerial vehicle, ground vehicle, aquatic vehicle, space vehicle, remote-controlled vehicle, large vehicle, small vehicle, and so on, unless explicitly stated otherwise or clear from the text. For example, the autonomous vehicles described herein may include helicopters or other vehicles using horizontal propellers for lift, and so forth. The autonomous vehicles described herein may also, or instead, include aerial vehicles with forward flight capability, such as fixed-wing aerial vehicles. For additional information, other suitable autonomous vehicles are disclosed in greater detail by commonly owned U.S. Pat. No. 8,500,067, entitled "Modular Miniature Unmanned Aircraft With Vectored-Thrust Control."

Generally, an electronics module may be used to house the vehicle's avionics, power supply (e.g., a propulsion battery), sensor payload, and communication device or system. As noted above, the electronics module may be integrated with the airframe 202 or contained within a separate housing, which may also potentially providing rigidity to the airframe 202. Thus, the electronics module may be removable from and replaceable to the airframe 202, and may house any systems or subsystems of the e-bumper and/or navigation system and methods as contemplated herein. The electronics module may comprise electronics and hardware used to support, or facilitate, the e-bumper and navigation system and methods. However, certain electronics and/or hardware may be configured outside of the electronics module housing. For instance, the vehicle 200 may further include one or more sensors 210 used to facilitate autonomous flight, which may include, without limitation, echolocation sensors, ultrasonic sensors, infrared sensors, radar, and the like. The sensors 210 may be appropriately installed on the vehicle 200 so as to enable functionality. For example, placement of certain sensors (e.g., those that are vision- or acoustic-based) may be configured on the vehicle 200 outside the electronics module housing (if used) because placement of certain sensors within the electronics module housing could hinder or prohibit sensor functionality. For instance, as illustrated in FIGS. 2a and 2b, sensors 210 may be positioned on the surfaces (e.g., top, bottom, edges, etc.) of the airframe 202 and/or atop the electronics module housing (e.g., separate housing 208).

The sensors 210 may employ one or more echolocation sensors, which generally function by emitting a sound frequency into an environment and detecting any echoes of the sound frequency that return from obstacles near the echolocation sensors. Using the strength of the echo and/or direction of echo's return, the echoes may be used to locate and/or identify obstacles, which in turn may cause the aerial vehicle to change direction so as to avoid collision with one or more obstacles.

Regardless of the type of sensors 210 employed, the dynamic collision-avoidance system may be configured to override, or attenuate, commands from a remotely situated pilot when such commands would cause the vehicle 200 to collide with an obstacle. Accordingly, the dynamic collision-avoidance system provides: (1) attenuation of user inputs that would lead to a collision; and (2) if necessary, active reduction of the velocity component in the direction of the object.

To that end, the sensor may be positioned to obtain a field of view in the vehicle's direction of travel, thereby identifying potential obstacles in the vehicle 200's path. For example, a single sensor (or single group of sensors) may be provided at the front of the vehicle to detect a threat of collision (e.g., obstructions or obstacles) in the path of the vehicle. Moreover, a plurality of sensors 210 (or multiple groups of sensors) may be positioned around the perimeter (and/or top and bottom) of the vehicle 200 to provide a field of view that is oriented with the vehicle 200's line of flight. Accordingly, the plurality of sensors 210 would enable the vehicle 200 to detect a threat of collision on any side of the vehicle 200.

As described herein, the sensors 210 may include, inter alia, any vision-based sensor or echolocation sensor known in the art or that will become known in the art, including, without limitation, ultrasonic sensors and the like. In one aspect, the cameras 206 may be used to identify larger objects through three-dimensional reconstruction techniques such as optical flow. While this may provide useful information for autonomous navigation, the processing latency associated with optical imaging, as well as the sensitivity to the visibility of various types of objects, may limit the utility of optical sensing techniques for detecting small, rapidly approaching objects in a line of flight of a vehicle. By orienting the sensors 210 toward the line of flight, acoustic detection may supplement optical detection and be used for detecting immediate obstructions that should trigger the execution of responsive maneuvers by a vehicle.

It will be appreciated that one purpose of the acoustic sensors is to provide immediate detection of obstacles directly in a flight path (or other line of travel), particularly obstacles that might not be detected using visual detection or other techniques. Correspondingly, it should be appreciated that one purpose of the sensors 210 is to provide immediate detection of obstacles in a specific direction (e.g., any direction of the vehicle), particularly obstacles that might not be readily detected using visual detection or other techniques. While an echolocation array operates well in this context, other sensor systems may also, or instead, be suitably employed for rapid, accurate detection of obstacles, such as laser-based techniques or any other suitable techniques using optical, acoustic, radio frequency, or other sensing modalities. Any such technique suitable for implementation in an autonomous vehicle and capable of accurately and quickly identifying obstructions may be used in place of the echolocation sensors in the systems and methods contemplated herein. Thus, the dynamic collision-avoidance system is generally sensor-agnostic, in that it can be configured to employ one of a variety of sensor technologies, or combination thereof. For example, the dynamic collision-avoidance system may employ a combination of vision- and acoustic-based sensors.

While the electronics module may be provided as a single housing, the electronics module may instead comprise multiple housings or "sub-housings." For example, the electronics module may be divided into two housings, a first housing for heavier components, such as the battery, and a second housing for the more delicate components, such as the avionics, surveillance payload, sensor payload, and any other electronic equipment. The components may be distributed, or divided amongst housings, so as to provide a desired weight distribution across the airframe 202.

A flight-control system may be used to control and/or navigate the vehicle 200. The flight-control system need not be a separate physical item on the vehicle, but rather may be a component of a larger navigation system or may itself include all of the components of the navigation system. Unless explicitly stated otherwise or clear from the text, any components described with reference to the navigation system may also be used by or included in the flight-control system and vice versa. In operation, the flight-control system may determine and/or instruct the vehicle 200 to follow a navigational path in order to reach a desired location based upon signals received from the components of the navigation system. For example, the flight-control system may facilitate autopilot functionality and/or respond to remote navigation commands. To that end, the flight-control system 306 may communicatively couple the vehicle 200 with a remote location, and may be configured to send and receive signals between (e.g., to and from) the vehicle 200 and the remote location. Functionality of the navigational module may be distributed in any suitable manner between components in the flight-control system, components elsewhere in the vehicle 200, and/or remotely located components. Moreover, a suitable electronic, mechanical, and communication interface may be provided to facilitate removal and replacement of the electronics module to the airframe 202.

Figure 3:
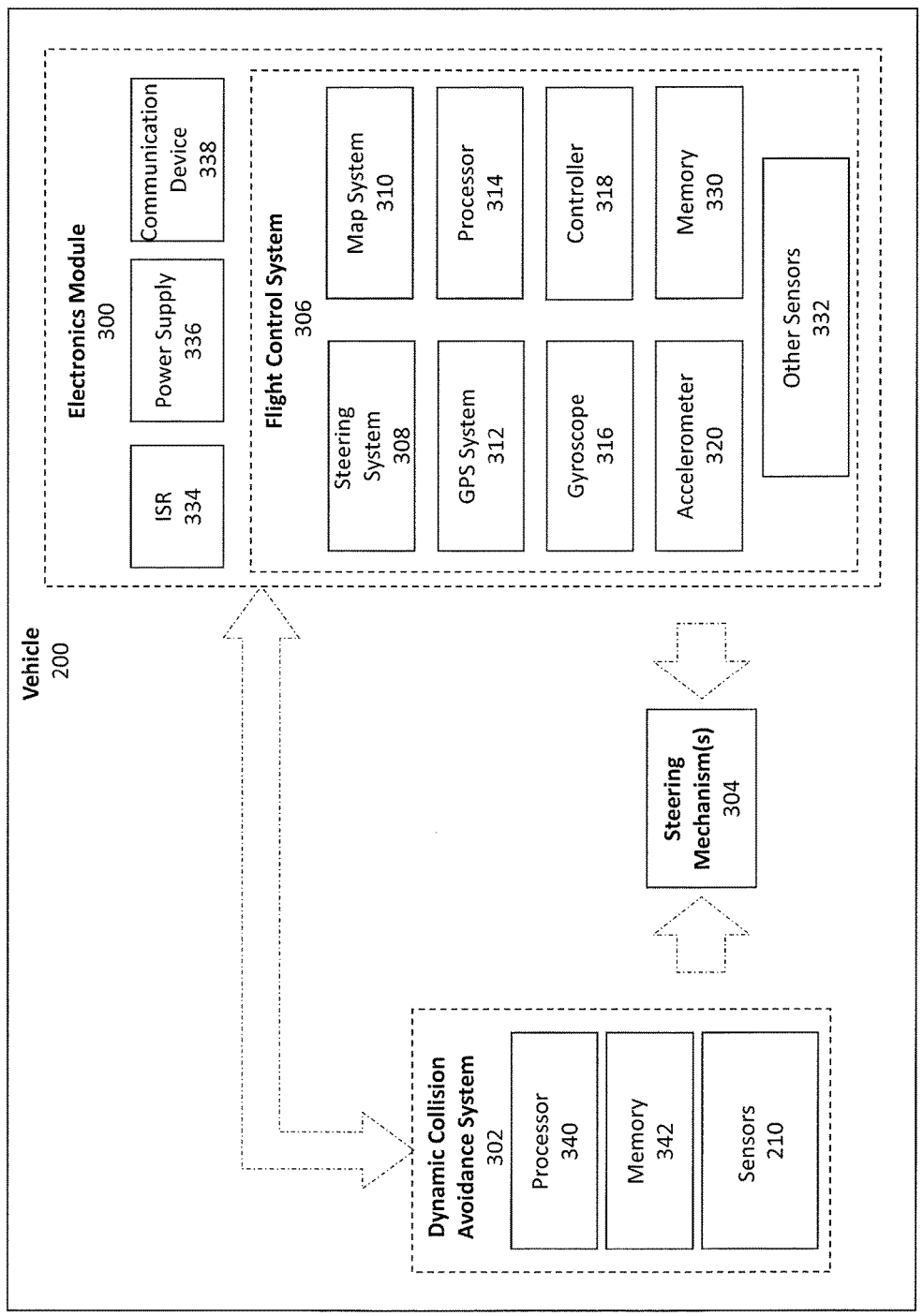
FIG. 3 is a block diagram of a dynamic collision-avoidance and navigation system for an autonomous vehicle.

FIG. 3 is a block diagram of a vehicle 200 (e.g., an autonomous vehicle) having a flight-control system 306, a dynamic collision-avoidance system 302, an electronics module 300, and a steering mechanism 304. More particularly, FIG. 3 illustrates the electronics module 300 as being used to house, or otherwise contain, the vehicle's flight-control system 306, power supply 336 (e.g., a propulsion battery), sensor payload (e.g., ISR payload 334) and communication device(s) 338. However, while a particular arrangement is illustrated in FIG. 3, it will be understood that the arrangement of components may vary. For example, the flight-control system 306 and/or the dynamic collision-avoidance system 302 may be located within one or more dedicated housings and/or removable from the vehicle 200.

For example, the dynamic collision-avoidance system's functionality may by provide via a retrofit navigational module removably and non-permanently coupled to the vehicle (e.g., via the airframe). Such a retrofit navigational module may be configured to intercept and modify signals or navigation commands as disclosed herein.

Alternatively, the flight-control system 306 and/or the dynamic collision-avoidance system 302 may be integrated into the vehicle 200 and coupled in a communicating relationship with the electronics module 300 and/or steering mechanism 304. The flight-control system 306 and/or the dynamic collision-avoidance system 302 may, in certain embodiments, share components, such as memory, sensors, processors, or controllers. Further, the electronics module 300 may be removably coupled to the vehicle 200 or integrated into a fuselage or the like of the vehicle 200 in any desired manner. Thus, the arrangement of the various components may be configured as desired by the designer or operator and therefore should not be limited to a particular example described or illustrated herein. For example, flight-control system 306 and/or dynamic collision-avoidance system 302 may attach to an exterior of a vehicle, or be disposed wholly or partially within the vehicle. The flight-control system 306 and/or dynamic collision-avoidance system 302 may be a removable and replaceable package or a module that is removable from and replaceable to the vehicle, or be permanently coupled to or integrated into the vehicle.

A modular housing may encase one or more components of the electronics module 300, the flight-control system 306, and/or the dynamic collision-avoidance system 302. The modular housing may be constructed of plastic, metal, wood, a composite material, ceramic, or any material suitable for the purposes of a particular vehicle or type of vehicle. The modular housing may be detachable or ejectable, or it may be permanently coupled to the vehicle. The modular housing may be attached to the vehicle in any manner known to one of ordinary skill in the art. The modular housing may include openings for sensors such as the sensors 210.

Electronics Module 300. As discussed above, the electronics module 300 may be used to house the vehicle's 200 avionics (e.g., the flight-control system 206), power supply 336, sensor payload, such as an ISR payload 334, and communication device or system 338; and may be integrated with the airframe 202 or contained within a separate housing. In certain aspects, the electronics module 300 may further comprise the dynamic collision-avoidance system 300, or functionality thereof.

Steering Mechanism 304. The steering mechanism 304 may be configured to steer the vehicle 200 (whether autonomously or under manned control) on a navigational path to reach an objective as contemplated herein. The vehicle 200 may be any vehicle referenced herein or otherwise known in the art (or as will be known in the art). Similarly, the steering mechanism 304 may be any form of steering referenced herein or otherwise known in the art (or as will be known in the art). In general, the steering mechanism 304 responds to signals from the flight-control system 306, which may employ feedback or other control systems to accurately direct the vehicle 200 along an intended route.

As noted above, the steering mechanism 304 may include, for example, rudders at the rear of the vehicle 200, as well as elevators, and any other suitable control surfaces for vertical flight vehicles, along with associated cables, actuators, and so forth. The steering mechanism 304 may also, or instead, include any mechanism for steering an autonomous vehicle. For example, for aerial vehicles, the steering mechanism 304 may more generally include rudders, elevators, flaps, ailerons, spoilers, air brakes, and other control surfaces. For other aerial vehicles, such as a helicopter, the steering mechanism 304 may include a number of rotors, which may be fixed rotors or steerable rotors, along with foils and other control surfaces. The steering mechanism 304 may also include articulated, electric motors employing vectored-thrust control to directly change the thrust vector. For land-based vehicles, the steering mechanism 304 may include a rack and pinion system, variably rotatable treads, a recirculating ball system, and the like. The steering mechanism 304 may also, or instead, include any components to provide thrust, acceleration, and deceleration of the vehicle 200, along with directional control. While vehicles may generally use separate or integrated components for drive and direction, all such combinations that facilitate control over movement of a vehicle are intended to fall within the scope of a "steering mechanism" as contemplated herein.

Dynamic Collision-Avoidance System 302. The e-bumper module generally facilitates the obstacle-avoidance system's e-bumper functionality. Indeed, the flight-control system 306 and a dynamic collision-avoidance system 302 may cooperate to provide an obstacle-avoidance system. As disclosed herein, the dynamic collision-avoidance system 302 may include one or more sensors 210, where each sensor 210 may have an acoustic field of view ("FOV"). However, the sensors 210 may be any of the echolocation sensors referenced herein or otherwise. Using these sensors 210, the dynamic collision-avoidance system 302 may detect an unanticipated obstacle 122 and communicate responsive navigation commands to said flight-control system 306 in order to avoid said unanticipated obstacle 122.

The dynamic collision-avoidance system 302's functionality may be facilitated via flight-control system 306, or an independent system, using a processor 340 (or other comparable logic), memory 342, and one or more sensors 210 (e.g., acoustic sensors, visual sensors, or a combination thereof) positioned along the top, bottom, and/or perimeter (e.g., one or more edges) of the vehicle 200's airframe 202, as illustrated in, for example, FIGS. 2a and 2b. The dynamic collision-avoidance system 302 may be used to reduce the likelihood of collisions with obstacles in any orientation of the vehicle 200, and for any relative location of objects to the vehicle. More specifically, a dynamic collision-avoidance system 302 may be provided through a plurality of sensors 210, which may be used to detect various obstacles. In general, the dynamic collision-avoidance system 302 may communicate directly with the steering mechanism 304 (or via a controller) and/or with the flight-control system 306, in order to provide, e.g., sensed data from the sensors 210 and/or derivative commands (e.g., a modified navigation command, such as an alternative navigation path, attenuated navigation signal, or a responsive maneuver, which may be a control command responsive to the sensed data or global environment estimate value and configured to avoid an unanticipated obstacle 122). Accordingly, the dynamic collision-avoidance system 302 is particularly useful in missions involving operation in close proximity to obstacles.

Certain benefits and contributions of the dynamic collision-avoidance system 302 include: (1) the sensor-agnostic method which may be used to generate the global environment estimate based on individual sensor inputs, (2) the sensor-agnostic method which may be used to interface with the existing vehicle control infrastructure in a vehicle-agnostic approach, and (3) the navigation algorithms necessary to fulfill the e-bumper functionality. For instance, the dynamic collision-avoidance system 302 may be integrated into the vehicle 200 and coupled in a communicating relationship with the steering mechanism 304, the flight-control system 306, an optical system, sensors 210, or combination thereof.

The dynamic collision-avoidance system 302 is also advantageous in that it employs a relatively straightforward state machine to activate, scale, or deactivate the influence of each component—user input, proportional-integral-derivative ("PID") on distance, autopilot commands, etc.—in response to the distance from the object, thereby reducing risk of error. Further, a complete state machine estimate can be assembled with as little as four echolocation sensors. However, in certain embodiments (e.g., when only one direction needs be monitored), an obstacle-avoidance system may be provided using only a single sensor placed on the front end of the vehicle. Another advantage of the dynamic collision-avoidance system 302, as disclosed herein, is that the dynamic collision-avoidance system 302 does not require any cooperative target sensors. That is, corresponding sensors need not be placed on obstacles, thereby greatly enhancing the utility of the dynamic collision-avoidance system 302. Further, the dynamic collision-avoidance system 302 does not require aerial vehicle data information or collision-avoidance algorithms.

A variety of physical configurations are possible and the dynamic collision-avoidance system 302 may also, or instead, be integrated with the vehicle 300, the flight-control system 306, or include any components described herein. To that end, as discussed with regard to FIGS. 2a and 2b, sensors 210 may be integrated within the vehicle 300's shell. Integration of sensors 210 offers a number of advantages. For example, the integration of sensors 210 provides a compact package (e.g., in size and weight), while avoiding echolocation sensor interference (cross talking), as well as/along with avoiding electromagnetic interference ("EMI") and propeller acoustic noise. Moreover, the vehicle 200 shell allows for precise placement, low drag, and easy swap of sensors 210 (e.g., if a sensor becomes damaged or if it is otherwise desirable to replace/upgrade the sensor). For example, a recess may be provided within the shell of the vehicle for one or more sensors, thereby mitigating unwanted drag. The sensor may be further covered with a protective cover. The protective cover should, however, be configured so as to not inhibit the sensors' functionality/reliability. For example, when acoustic-based sensors are employed, the protective cover should be acoustically invisible (e.g., a fabric or a reflector having tiny, regularly spaced holes covered by a thin, elastic membrane). One example of an acoustically invisible reflector material is described by Jong Jin Park, et al., in the publication entitled, "Giant Acoustic Concentration by Extraordinary Transmission in Zero-Mass Metamaterials," Phys. Rev. Lett. 110, 244302 (published Jun. 13, 2013). Similarly, when vision-based sensors are employed, the protective cover should transparent or otherwise designed to permit visibility.

Although the current dynamic collision-avoidance system 302 is described as using echolocation sensors as sensors 210, the dynamic collision-avoidance system 302 may employ measurements received from any sensor (whether echolocation sensors or another type described herein, without limitation thereto) and fuses the received data to create a global environment estimate. From that global environment estimate, features of interest to the algorithms may be extracted and stored in a target database. The global environment estimate may be an abstracted summary of what the sensors are detecting around the aircraft. For example, if multiple sensors are available that provide a measurement of the same state (e.g. range to an obstacle) it fuses those states. If multiple sensors are available that provide multiple distinct states (e.g. range to, and velocity/closure rate of obstacle). By instantiating this global environment estimate as an abstracted summary of the sensed data, as discussed above, it serves as a single interface accessible by the bank of algorithms.

This target database may serve as a common interface for any algorithm that may be used by the dynamic collision-avoidance system 302 or another autonomous vehicle navigation or obstacle-avoidance system. In the case of the dynamic collision-avoidance system 302, objects that are determined to pose a collision threat are passed to the dynamic collision-avoidance system 302-specific algorithms.

As discussed above, the dynamic collision-avoidance system 302 may be integrated with the vehicle 200 via a flight-control system 306's vehicle control interface, without modifying the existing systems on the vehicle 200, and without requiring knowledge of the state of the vehicle's autopilot (or manned control). For instance, an embedded logic device or processor 340, such as an Arduino© microprocessor, may (1) intercept the original navigation commands (e.g., flight commands by a pilot or autopilot), (2) attenuate in accordance with a predetermined e-bumper algorithm, and (3) feed new or modified navigation commands (e.g., attenuated commands generated by the dynamic collision-avoidance system) to the vehicle's flight-control system 306 (e.g., autopilot) or steering mechanism 304 as replacement or override navigation commands. In addition, the dynamic collision-avoidance system 302 may intercept the control signals (e.g., navigation commands) from the autopilot to the thrust generators 206 (e.g., an electric motor via pulse-width modulation ("PWM") signals) and modify those signals prior to sending them to the flight-control system 306 and/or thrust generators 206 (e.g., motors, turbines, etc.). A benefit of the presently disclosed dynamic collision-avoidance system 302 is that it achieves the objective of obstacle avoidance without requiring alterations to the vehicle 200—that is, the dynamic collision-avoidance system 302 is vehicle-agnostic. In certain aspects, because significant delays in the system can result in undesirable operation of the vehicle 200, the software implemented on the dynamic collision-avoidance system 302's embedded device may be constantly monitored for execution speed.

With the global environment estimate and vehicle control interface in place and tuned, the dynamic collision-avoidance system 302 may focus on navigation commands (such as those by a pilot or autopilot) that would cause the vehicle to crash into an object. The PID distance controller may also able to hold position and reject unwanted user input (e.g., obstacle avoidance). Pilot inputs (e.g., navigation commands) may be rejected or modified with high-pass, low-pass, and band-pass filters, feed-forward approaches, and high-gain integrators. In addition, gain-scheduling techniques are implemented for robust controllability. For example, in the case where the vehicle approaches the unanticipated obstacles 122 due to control inputs by the vehicle's operator, the dynamic collision-avoidance system may reduce the effectiveness of those control inputs as a function of the distance to the object. If the vehicle continues to approach the unanticipated obstacles 122, the dynamic collision-avoidance system eventually completely attenuates all control inputs in the direction of the object and/or actively reduces the velocity with which the object is approached. Similarly, if the vehicle is moved toward an object due to environmental conditions (e.g., winds or gusts) so as to create a collision hazard, the dynamic collision-avoidance system provides navigation commands to ensure that the vehicle's position does not drop below a predetermined safe distance from the object. The attenuation may be adjusted such that the dynamic collision-avoidance system reduces the effectiveness of those control inputs (e.g., navigation commands) as a function of the distance to the object. For example, an inverse distance-attenuation function may be employed whereby, as the distance between the vehicle and the object decreases, the control input attenuation increases such that the control inputs are effectively decreased, disregarded, or reversed. Further, in certain situations, the dynamic collision-avoidance system can be engaged to maintain the vehicle at a fixed distance from an object to allow that object to be systematically surveyed at close range without danger of impacting the unanticipated obstacles 122. The dual-mode capability of the dynamic collision-avoidance system 302, which includes both the capability to hold distance relative to object or perform obstacle avoidance during flight, makes the dynamic collision-avoidance system 302 useful to a wide range of users. That is, holding a distance between the vehicle and the object is advantageous for data collection while obstacle avoidance assists inexperienced pilots.

The dynamic collision-avoidance system 302 may further include an armed/disarmed feature. The armed/disarmed feature may be used, for example, to prevent the e-bumper controller from erroneously signaling a collision upon detecting the ground during launch or landing. Indeed, the safety measures to arm and disarm the dynamic collision-avoidance system 302 at various phases of the flight, takeoff, and landing further increase robustness and safety of the vehicle 200. For example, the dynamic collision-avoidance system 302 may be manually actuated by the controller (e.g., a pilot operating the vehicle), or automatically armed/disarmed depending on the distance, position, altitude, flight time, etc. of the vehicle. In certain aspects, the dynamic collision-avoidance system 302 may be configured to switch between one of a plurality of operation modes. The desired operation mode may be selected using, for example, a physical switch positioned on the aerial vehicle, remotely via a user interface/device (e.g., via a remote controller/ground point), or the like. Example operation modes include, without limitation, a disabled mode (i.e., the system is off), a precision mode, a performance mode, etc. For example, in precision mode, the dynamic collision-avoidance system 302 may enable features such as auto-takeoff, rejection of erroneous user inputs, obstacle avoidance, precision control of the aircraft through adjusted input control/aircraft response mapping, etc. Precision mode may also be designed to allow the UAV to approach to obstacles closer than in performance mode (e.g. about 1 to 10 feet, more preferably about 3-7 feet, or about 4.5 ft.). In performance mode, the dynamic collision-avoidance system 302 may provide the same benefits as precision mode, but be optimized for faster flight regimes. For example, in performance mode, the aircraft may avoid obstacles at a greater distance than the performance mode. Additionally, the avoidance maneuver may be more aggressive than the maneuver in precision mode to protect against higher operational velocities.

Flight-Control System 306. The flight-control system 306 may determine one or more navigational paths for the vehicle 200 to reach a desired location based upon signals received from the components of a navigation system. The flight-control system 306 may calculate, generate, and send navigation commands (e.g., data signals) to the steering mechanism 304 to direct the vehicle 200 along a navigational path to the desired location. The flight-control system 306 may be disposed wholly or partially inside a separate housing, inside the airframe 202, or some combination thereof. The flight-control system 306 may further include any of the components of the dynamic collision-avoidance system 302 or flight-control system 306 described, for example, with reference to FIG. 3. Indeed, the flight-control system 306 and a dynamic collision-avoidance system 302 are generally configured to direct, or otherwise control, one or more steering mechanisms 304 within a vehicle 200. The flight-control system 306 may be coupled in a communicating relationship with the vehicle 200 and a remote location and may be configured to send and receive signals to and from the vehicle 200 and the remote location via communication device 338. Communication device 338 may be, for instance, a wireless transceiver and antenna.

In general, the flight-control system 306 may include a steering system 308, a map system 310, a GPS system 312, a processor 314, a gyroscope 316, a controller 318, an accelerometer 320, and/or a memory 330. The flight-control system 306 may also include the components described above as being disposed within the electronics module 300 housing, as well as other sensors 332, such as any other conventional flight instrumentation, sensors, processing circuitry, communications circuitry, optical system including cameras and the like, necessary or useful for operation of an unmanned aerial vehicle or other autonomously or manually piloted vehicle. One or more of the flight-control system 306's components may be housed within the electronics module 300 housing.

The flight-control system 306 may be communicatively coupled with the one or more steering mechanisms 304 and/or the dynamic collision-avoidance system 302. For instance, the steering system 308 may be configured to receive signals from the flight-control system 306 (or dynamic collision-avoidance system 302) and provide suitable control signals to the steering mechanism 304 of the vehicle in order to direct the vehicle 200 along an intended route.

The map system 310 may be part of a map-based flight-control system that provides positional information about natural and manmade features within an area. This may include information at any level of detail including, e.g., topographical maps, general two-dimensional maps identifying roads, buildings, rivers, and the like, or detailed, three-dimensional data characterizing the height and shape of various natural and manmade obstructions such as trees, sculptures, utility infrastructure, buildings, and so forth. In one aspect, the map system 310 may cooperate with an optical system for visual verification of surrounding context or the map system 310 may cooperate with the GPS system 312 to provide information on various obstacles within an environment for purposes of path determination or the like. In one aspect, the map system 310 may provide a supplemental navigational aid in a GPS-denied or GPS-impaired environment. When GPS is partially or wholly absent, the map system 310 may cooperate with other sensors 332, such as optical sensors, inertial sensors, and so forth to provide positional information until a GPS signal can be recovered.

The map system 310 may more generally communicate with other components of the flight-control system 306 in order to support navigation of a vehicle as contemplated herein. While this may include providing map information for calculation of routes, this may also include independent navigational capabilities. For example, the map system 310 may provide a map-based navigation system that stores a map of an operating environment including one or more objects. The map-based navigation system may be coupled to cameras and configured to determine a position of a vehicle by comparing stored objects to a visible environment, which may provide position data in the absence of GPS data or other positional information.

The GPS system 312 may be part of a global positioning system configured to determine a position of the electronics module 300 or the vehicle 200. The GPS system 312 may include any GPS technology known in the art or that will become known in the art, including conventional, satellite-based systems as well as other systems using publicly or privately operated beacons, positional signals, and the like. The GPS system 312 may include one or more transceivers that detect data for use in calculating a location. The GPS system 312 may cooperate with the other components of the flight-control system 306 to control operation of the vehicle 200 and navigate the vehicle along an intended path.

The gyroscope 316 may be a device configured to detect rotation of the electronics module 300 or the vehicle 200 to which the electronics module 300 is coupled. The gyroscope 316 may be integral with the vehicle 200 or it may be disposed inside or outside of the electronics module 300 housing. The gyroscope 316 may include any gyroscope or variations thereof (e.g., gyrostat, microelectromechanical systems ("MEMS"), fiber-optic gyroscope, vibrating-structure gyroscope, dynamically tuned gyroscope, and the like) known in the art or that will become known in the art. The gyroscope 316 may cooperate with the other components of the flight-control system 306 to control operation of the vehicle 200 and navigate the vehicle along an intended path.

The accelerometer 320 may be any device configured to detect a linear motion of the electronics module 300 or the vehicle 200. The accelerometer 320 may be integral with the vehicle 200 or it may be disposed inside or outside of the electronics module 300 housing. The accelerometer 320 may include may include any accelerometer known in the art (e.g., capacitive, resistive, spring-mass base, direct current ("DC") response, electromechanical servo, laser, magnetic induction, piezoelectric, optical, low frequency, pendulous integrating gyroscopic accelerometer, resonance, strain gauge, surface acoustic wave, MEMS, thermal, vacuum diode, and the like) or that will become known in the art. The accelerometer 320 may cooperate with the other components of the flight-control system 306 to control operation of the vehicle 200 and navigate the vehicle along an intended path.

Other sensors (or sensor systems) 332 may also be similarly employed. For example, the vehicle 200 (or the flight-control system 306, dynamic collision-avoidance system 302, or electronics module 300 of the vehicle) may employ infrared sensors, RADAR (i.e., RAdio Detection And Ranging) sensors, LiDAR (i.e., Light Detection and Ranging) sensors, and so forth. Any of the foregoing may be used alone or in combination with other systems and sensors described herein to augment vehicle navigation. The processor 314 may be coupled in a communicating relationship with the controller 318, the vehicle 200, the flight-control system 306, the steering mechanism 304, and the other various other components, systems, and subsystems described herein. The processor 314 may be an internal processor of the vehicle 200 or the flight-control system 306, an additional processor within the electronics module 300 to support the various navigational functions contemplated herein, a processor of a desktop computer or the like, locally or remotely coupled to the vehicle 200, and the flight-control system 306, a server or other processor coupled to the vehicle 200 and the flight-control system 306 through a data network, or any other processor or processing circuitry. In general, the processor 314 may be configured to control operation of the vehicle 200 or the flight-control system 306 and perform various processing and calculation functions to support navigation. The processor 314 may include a number of different processors cooperating to perform the steps described herein, such as where an internal processor of the vehicle 200 controls operation of the vehicle 200 while a processor in the housing preprocesses optical and echolocation data.

The processor 314 may be configured to determine or revise a navigational path for the vehicle 200 to a location based upon a variety of inputs including, e.g., position information, movement information, dynamic collision-avoidance system 302 data, and so forth, which may be variously based on data from the GPS system 312, the map system 310, the gyroscope 316, the accelerometer 320, and any other navigation inputs, as well as an optical system and the echolocation system, which may provide information on obstacles in an environment around the vehicle 200. An initial path may be determined, for example, based solely on positional information provided by the GPS system 312, with in-flight adjustments based on movements detected by the gyroscope 316, accelerometer 320, and the like. The processor 314 may also be configured to utilize an optical navigation system, where the processor is configured to identify a visible obstacle within the FOV of an optical system; for example, using optical flow to process a sequence of images and to preempt the GPS system 312 to navigate the vehicle 200 around visible obstacles and toward the location. The processor 314 may be further configured to identify an obstacle within the FOV of the dynamic collision-avoidance system 302, usually within a line of flight of the vehicle, and further configured to preempt the GPS system 312 and the optical navigation system to execute a responsive maneuver that directs the vehicle 200 around the obstacle and returns the vehicle 200 to a previous course toward the location.

The controller 318 may be operable to control components of the vehicle 200 and the flight-control system 306, such as the steering mechanism 304. The controller 318 may be electrically or otherwise coupled in a communicating relationship with the processor 314, the vehicle 200, the flight-control system 306, the steering mechanism 304, and the other various components of the devices and systems described herein. The controller 318 may include any combination of software and/or processing circuitry suitable for controlling the various components of the vehicle 200 and the flight-control system 306 described herein, including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the vehicle 200 and the flight-control system 306, such as an on-board processor. In another aspect, this may be a processor, such as the processor 314 described herein, which may be associated with a personal computer or other computing device coupled to the vehicle 200 and the flight-control system 306, e.g., through a wired or wireless connection. Similarly, various functions described herein may be allocated among an on-board processor for the vehicle 200, the flight-control system 306, and a separate computer. All such computing devices and environments are intended to fall within the meaning of the term "controller" or "processor" as used herein, unless a different meaning is explicitly provided or otherwise clear from the context.

The memory 330 may include local memory or a remote storage device that stores a log of data for the flight-control system 306, including, without limitation, the location of sensed obstacles, maps, images, orientations, speeds, navigational paths, steering specifications, GPS coordinates, sensor readings, and the like. The memory 322 may also, or instead, store a log of data aggregated from a number of navigations of a particular vehicle, or data aggregated from a number of navigations of different vehicles. The memory 322 may also, or instead, store sensor data from an optical system and dynamic collision-avoidance system 302, related metadata, and the like. Data stored in the memory 330 may be accessed by the processor 314, the controller 318, a remote processing resource, and the like.

Figure 4:
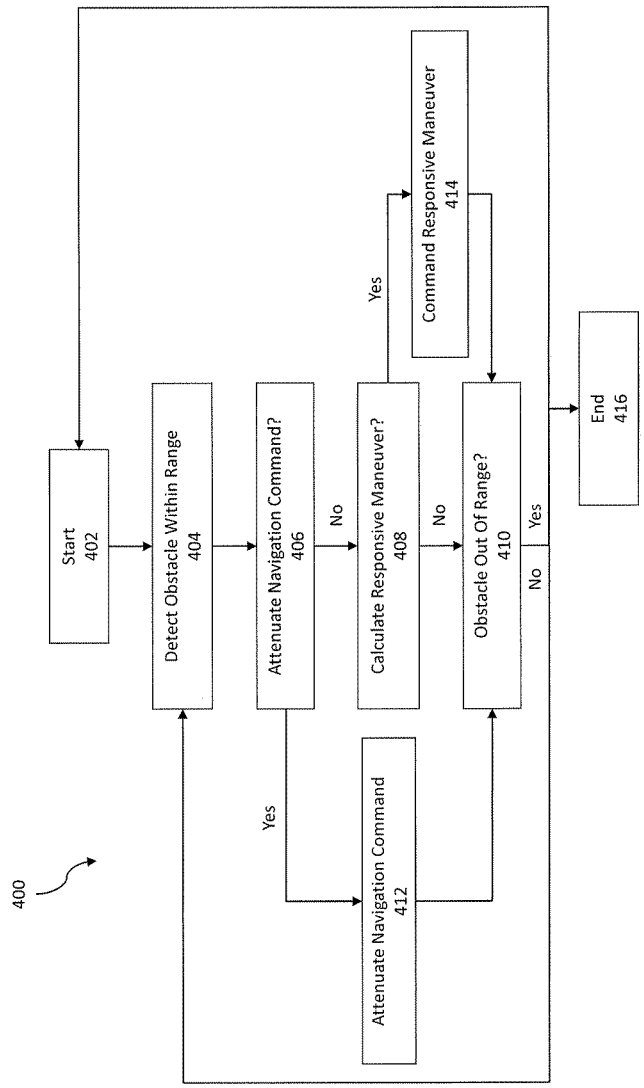
FIG. 4 is a flow chart of a method for using a dynamic collision-avoidance system when navigating a vehicle from a position to an objective.

FIG. 4 is a flow chart of a method 400 for navigating a vehicle using the dynamic collision-avoidance system. The dynamic collision-avoidance system starts, or is activated, at step 402. Once activated, the dynamic collision-avoidance system monitors the environment (e.g., in each direction of freedom) using one or more sensors. As discussed above, the sensors may be, for example, echolocation sensors. As shown in step 404, the method 400 may include detecting an unanticipated obstacle 122.

As shown in step 404, the method 400 may include detecting an obstacle using one or more echolocation sensors (or other suitable sensor). Step 404 may include outputting acoustic signals, detecting echoes of those acoustic signals, and using the detected echoes to determine the size and location of the obstacle. In general, this may be any obstacle capable of detection through auditory flow that blocks, partially blocks, obscures, endangers, etc., the navigational path of the vehicle from the position to the objective. The obstacle may be any physical obstacle such as a building, tree, power line, rock, and so forth. More generally, the first obstacle may be any location or path that the vehicle should avoid.

As shown in step 406, the method 400 may include determining whether to attenuate the navigation commands. The decision as to whether to attenuate the navigation commands at step 412 or to calculate a responsive maneuver at step 408 may be based upon the distance of the obstacle. For example, if the distance to the obstacle is meets or exceeds a predetermined distance threshold, the dynamic collision-avoidance system's processor may attenuate the navigation commands at step 412. If the distance to the obstacle is less than a predetermined distance threshold, thus suggesting a more imminent collision, the dynamic collision-avoidance system's processor may calculate responsive maneuver at step 408.

As shown in step 412, the method 400 may include attenuating the navigation commands. For example, in a case where the vehicle approaches the obstacles due to control inputs by the vehicle's operator or autopilot, the dynamic collision-avoidance system may adjust the control inputs based on the distance to the object. If the vehicle continues to approach the obstacles, the dynamic collision-avoidance system may eventually completely reject all control inputs in the direction of the object and/or actively reduce the velocity with which the object is approached.

As shown in step 414, the method 400 may include calculating a responsive maneuver that avoids the obstacle. In one aspect, the responsive maneuver may be a predetermined responsive maneuver that provides a temporary excursion from the revised course and returns immediately to the revised course after the responsive maneuver has been executed. In another aspect, this may include selecting from among a number of predetermined responsive maneuvers according to information about the obstacle or dynamically creating a responsive maneuver according to feedback from the echolocation system. Where appropriate, the responsive maneuver may be further adapted to other data such as GPS data, optical data, or other sensor data in order to better respond to the context of the detected obstacle. However calculated, instructions for the responsive maneuver may be transmitted to a steering system for the vehicle for corresponding execution.

As shown in step 410, the method 400 may include determining whether the obstacle is out of range, as a result of the attenuation at step 412 or the responsive maneuver at step 414. If the obstacle is out of range, the method 400 may end at step 416, or, in the alternative, restart at step 402 so as to avoid future obstacles. If the obstacle is still in range, the method 400 may return to step 404.

The systems described herein may also include client devices, which may include any devices operated by users to initiate, manage, monitor, control, or otherwise interact with the navigation system or autonomous vehicle. This may include desktop computers, laptop computers, network computers, tablets, or any other computing device that can participate in the systems as contemplated herein. The client devices may include a user interface, which may include a graphical user interface, a text or command line interface, a voice-controlled interface, and/or a gesture-based interface to control operation of the navigation system or autonomous vehicle. The user interface may be maintained by a locally executing application on one of the client devices that receives data and status information from, e.g., the navigation system or autonomous vehicle. The user interface may create a suitable display on the client device for user interaction. For example, the user interface may include a display that displays, in real time, views from the cameras in the optical system, or displays other data from other sensors within the navigation system. In other embodiments, the user interface may be remotely served and presented on one of the client devices, such as where the navigation system or autonomous vehicle includes a web server that provides information through one or more web pages or the like that can be displayed within a web browser or similar client executing on one of the client devices. In one aspect, the user interface may include a voice-controlled interface that receives spoken commands from a user and/or provides spoken feedback to the user.

While the above systems are primarily described as being applied to aerial vehicles, one of skill in the art would understand that such systems, methods, and techniques may be employed with other technologies, such as automotive, warehouse equipment, construction equipment, cranes, powered wheel chairs, airport equipment, etc.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors, or other programmable devices or processing circuitry, along with internal and/or external memory. This may also, or instead, include one or more application-specific integrated circuits, programmable gate arrays, programmable array logic components, or any other device or devices that may be configured to process electronic signals. It will further be appreciated that a realization of the processes or devices described above may include computer-executable code, created using a structured programming language such as C, an object-oriented programming language such as C++, or any other high-level or low-level programming language (including assembly languages, hardware description languages, and database programming languages and technologies) that may be stored, compiled, or interpreted to run on one of the above devices, as well as heterogeneous combinations of processors, processor architectures, or combinations of different hardware and software. At the same time, processing may be distributed across devices, such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executed on one or more computing devices, performs any and/or all of the steps of the control systems described above. The code may be stored in a non-transitory fashion in a computer memory, which may be a memory from which the program executes (such as random access memory associated with a processor) or a storage device such as a disk drive, flash memory, or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description above and attached drawings is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An obstacle-avoidance system for augmenting control inputs in an aerial vehicle, the obstacle-avoidance system comprising:
   a sensor to generate obstruction data identifying a collision threats within a predetermined field of view (FOV); and
   a processor communicatively coupled to the sensor and a control system of the aerial vehicle, the processor being configured to dynamically:

receive an original control input having a magnitude from the control system, receive, from the sensor, obstruction data reflecting a position of a collision threat within the predetermined FOV, generate a modified control input by reducing the magnitude of the original control input as a function of a distance between the aerial vehicle and the collision threat, and output the modified control input to avoid the collision threat.

2. The obstacle-avoidance system of claim 1, wherein the sensor is an echolocation sensor to emit a sound frequency and to detect an echo resulting therefrom, wherein the processor is configured to determine the location of the collision threat in the predetermined FOV based at least in part on the strength or direction of the echo.

3. The obstacle-avoidance system of claim 1, wherein a plurality of sensors is positioned on the aerial vehicle to obtain a wide field of view that extends beyond the aerial vehicle's line of flight, wherein the plurality of sensors comprises an acoustic sensor to provide an acoustic FOV and an optical sensor to provide an optical FOV.

4. The obstacle-avoidance system of claim 3, wherein the plurality of sensors is positioned on the aerial vehicle to detect collision threats within a 360 degree FOV about the aerial vehicle.

5. The obstacle-avoidance system of claim 1, wherein the processor is configured to reduce the magnitude of original control inputs from a human pilot that instruct the aerial vehicle to travel toward the collision threat.

6. The obstacle-avoidance system of claim 1, wherein the processor is configured to reduce the magnitude of original control inputs from a human pilot that instruct the aerial vehicle to travel toward the collision threat while passing, without a reduction in the magnitude, original control inputs from the human pilot that instruct the aerial vehicle to navigate away from the collision threat.

7. The obstacle-avoidance system of claim 1, wherein the processor is configured to completely reject the original control input when the distance is less than a predetermined distance.

8. The obstacle-avoidance system of claim 1, wherein the processor is configured to output the modified control input to said control system in lieu of the original control input.

9. The obstacle-avoidance system of claim 1, wherein the processor is configured to output the modified control input to a steering mechanism or a controller of the steering mechanism in lieu of the original control input.

10. The obstacle-avoidance system of claim 1, wherein the obstacle-avoidance system is integrated with the control system.

11. The obstacle-avoidance system of claim 1, wherein the aerial vehicle includes a steering mechanism having a plurality of rotors operatively coupled with a controller.

12. The obstacle-avoidance system of claim 1, wherein the processor is configured to generate, based at least in part on said obstruction data, a global environment estimate to represent an environment in which the aerial vehicle is operating, wherein the global environment estimate is communicatively available to one or more aerial vehicle systems, including at least a navigation system.

13. The obstacle-avoidance system of claim 1, wherein the processor is configured to reduce the magnitude of the original control input as an inverse function, whereby reduction in the magnitude of the original control input increases as the distance decreases.

14. The obstacle-avoidance system of claim 1, wherein the modified control input is generated as a function of both the distance and environmental conditions.

15. The obstacle-avoidance system of claim 1, wherein the original control input is a pilot input from a wireless remote controller and the processor is configured to modify the original control input using at least one of: (1) a high-pass filter; (2) a low-pass filter; (3) a band-pass filter, (4) feed-forward control, and (5) a high-gain integrator.

16. A retrofit navigational module to provide improved navigation in an existing aerial vehicle having a flight-control system and a steering mechanism, the retrofit navigational module comprising:

a modular housing to couple with an exterior surface of the aerial vehicle;

a plurality of sensors coupled to the modular housing to generate obstruction data identifying a collision threat proximate to the aerial vehicle; and a processor communicatively coupled with each of the plurality of sensors, the flight-control system, and the steering mechanism, wherein the processor is configured to:

intercept an original control input having a magnitude sent from the flight-control system intended for the steering mechanism, generate a modified control input based at least in part on the original control input and said obstruction data, wherein the processor is configured to generate the modified control input by reducing the magnitude of the original control input as a function of a distance between the aerial vehicle and the collision threat, and communicate the modified control input to the steering mechanism in lieu of the original control input to avoid the collision threat.

17. The retrofit navigational module of claim 16, wherein the modular housing is removably coupled with the exterior surface of the aerial vehicle.

18. An aerial vehicle configured with the retrofit navigational module of claim 16.

19. An aerial vehicle comprising:

a flight-control system to dynamically output original control inputs;

a plurality of sensors to generate obstruction data identifying a collision threat;

a steering mechanism to steer the autonomous aerial vehicle along a navigational path in response to control inputs from the flight-control system; and a processor communicatively coupled to each of the plurality of sensors, the flight-control system, and the steering mechanism, the processor being configured to augment control inputs sent from the flight-control system to the steering mechanism, wherein the processor is configured to dynamically:

intercept original control inputs having a magnitude from a remote operator via the flight-control system;

generate augmented control inputs based at least in part on the original control inputs and said obstruction data by reducing the magnitude of the original control inputs as a function of a distance between the aerial vehicle and the collision threat; and communicate the augmented control inputs to the steering mechanism.

20. The aerial vehicle of claim 19, wherein the plurality of sensors comprises an echolocation sensor to provide an acoustic field of view (FOV) and an optical sensor to provide an optical FOV, wherein the echolocation sensor is configured to emit a sound frequency and to detect an echo resulting therefrom, wherein the processor is configured to determine the location of the collision threat in the acoustic FOV based at least in part on the strength or direction of the echo.

21. The aerial vehicle of claim 19, wherein the steering mechanism comprises at least four fixed rotors operatively coupled with a controller.

22. The aerial vehicle of claim 19, wherein the processor is configured to dynamically generate augmented control inputs to maintain the aerial vehicle at a fixed distance from a movable object to allow that movable object to be monitored without impacting a collision threat.

23. The aerial vehicle of claim 19, wherein the processor is configured to dynamically generate augmented control inputs to maintain the aerial vehicle at a fixed distance from a fixed object to allow that movable object to be monitored without impacting a collision threat.

24. The aerial vehicle of claim 19, wherein the plurality of sensors includes at least four echolocation sensors positioned on the aerial vehicle to detect collision threats within a 360 degree field of view that is oriented with the aerial vehicle's line of flight.

25. The obstacle-avoidance system of claim 6, wherein the original control input identifies an original navigational path and the modified control input identifies a modified navigational path, wherein the processor is configured to return the vehicle from the modified navigational path to the original navigational path once the collision threat is avoided.

26. The obstacle-avoidance system of claim 11,
wherein the obstacle-avoidance system is configured to be removably coupled with the aerial vehicle,
wherein the control system is an existing flight-control system of the aerial vehicle, and
wherein the processor is configured to output the modified control input to the steering mechanism in lieu of the original control input.

27. The obstacle-avoidance system of claim 26, wherein the obstacle-avoidance system is configured to intercept an original control input sent from the existing flight-control system intended for the steering mechanism.

28. The obstacle-avoidance system of claim 27, wherein the obstacle-avoidance system is operatively coupled with the aerial vehicle without modification to the existing flight-control system.

29. The obstacle-avoidance system of claim 27, wherein the obstacle-avoidance system is configured to replace the original control input with the modified control input and to send the modified control input to the steering mechanism in lieu of the original control input.

30. The obstacle-avoidance system of claim 11, wherein the obstacle-avoidance system is coupled to an exterior surface of the aerial vehicle.

31. The obstacle-avoidance system of claim 30, wherein the obstacle-avoidance system is removably coupled with the aerial vehicle via a modular housing.

* * * * *